Oct. 24, 1972    J. C. McCOY ET AL    3,700,535
CARBON FIBER STRUCTURE AND METHOD OF FORMING SAME
Filed March 12, 1971

INVENTORS
J. C. McCOY
JAMES W. STEELE
BY

United States Patent Office 3,700,535
Patented Oct. 24, 1972

3,700,535
CARBON FIBER STRUCTURE AND METHOD OF FORMING SAME
J. C. McCoy and James W. Steele, Overland Park, Kans., assignors to the United States of America as represented by the United States Atomic Energy Commission
Filed Mar. 12, 1971, Ser. No. 123,696
Int. Cl. B32b 5/12, 31/12
U.S. Cl. 161—47                    9 Claims

ABSTRACT OF THE DISCLOSURE

An annular carbon fiber structure including a multiplicity of carbon fiber layers, with each layer composed of a plurality of similar elongated quadrangular carbon fiber sheets laid side by side along the long dimensions of said sheets in generally spiral fashion about the structure with each sheet being made of unidirectional fibers laid side by side parallel to a long dimension of said sheets and with the fiber sheets of adjoining overlying layers disposed in oppositely angled relationship with respect to fibers of sheets in an adjoining layer and the process for making the same.

BACKGROUND OF INVENTION

Good quality, high strength carbon or graphite structures are used as reentry heat shields for space vehicles, as protective layers or structural members in high temperature environments, such as in rocket and jet engine applications, as energy absorbers or dissipaters in high performance brakes, and the like. Carbon and graphite structures are used for such applications because of the iinherent high thermal stability, light weight, chemical inertness, thermal shock resistance, low thermal expansion, and other similar properties of the materials. However, since carbon and graphite are relatively low strength materials, various techniques have been used to attempt to overcome or minimize this strength limitation while utilizing the favorable properties thereof.

The advent of commercial availability, of continuous carbon and graphite fibers opened the way to production of higher strength carbon and graphite materials through utilization of these fibers. A particularly attractive technique to achieve improved strength carbon is through the utilization of carbon or graphite fibers as reinforcement in a carbon or graphite matrix to obtain what can be termed carbon or graphite fiber reinforced carbon or graphite composites. Techniques to achieve a carbon or grahpite matrix include (1) chemical vapor deposition from various hydrocarbons and (2) char deposition from the thermal decomposition of organic systems in intimate contact with the reinforcing fibers. The reinforcement fibers may often be formed initially into some structural shape by use of carbonizable felt mattings, filament windings, or the like, and the same impregnated or otherwise filled with a resin or other carbon or carbon forming material. The resin or the like material may then be appropriately carbonized. These techniques and other similar techniques have met with limited success, especially when forming parts with shapes deviating significantly from flat panels, as they often result in a delaminated structure containing voids from the curing or carbonization steps of the process. This delamination may be caused by weight losses accompanied by corresponding shrinkage and associated internal stresses, for example, thickness reduction may be in the range of 5 to 10% depending on materials used while shrinkage in fiber directions is practically nil. This is a particular problem in annular structures where the circumferential and radial shrinkage of the structure during carbonization may also vary considerably with that of the wall thickness shrinkage.

SUMMARY OF INVENTION

In view of the above, it is an object of this invention to provide annular carbon or graphite matrix structures free from voids and delaminations. It is a further object of this invention to provide high strength conoid carbon or graphite structures having substantially balanced shrinkage in all directions.

It is a further object of this invention to provide process for forming such carbon or graphite structures.

Various other objects and advantages will appear from the following description of the invention, and the most novel features will be particularly pointed out hereinafter in connection with the appended claims. It will be understood that various changes in the details, materials and arrangement of the parts which are herein described and illustrated in order to explain the nature of the invention, may be made by those skilled in the art.

The invention comprises a carbon fiber structure and method of making the same utilizing a plurality of separate layers of carbon fibers, each of the layers including a plurality of similar elongated quadrangular carbon fiber sheets laid side by side along the long dimensions of said sheets in spiral fashion about the structure, each sheet being made of unidirectional fibers laid side by side parallel to a long dimension of the sheet and with the fiber sheets of adjoining layers wound in different angular relationships.

DESCRIPTION OF DRAWINGS

The invention is illustrated in the accompanying drawing wherein.

DETAILED DESCRIPTION

The carbon structures formed by the process of this invention are described for purpose of illustration as a conoid or truncated cone. It will be understood that other structure configurations and shapes may be formed in a similar manner by proper adjustment of the fiber sheet or gore shapes used in the lay-up of the structure. Such other structures may include cylinders, tubes and the like.

Figure 1:
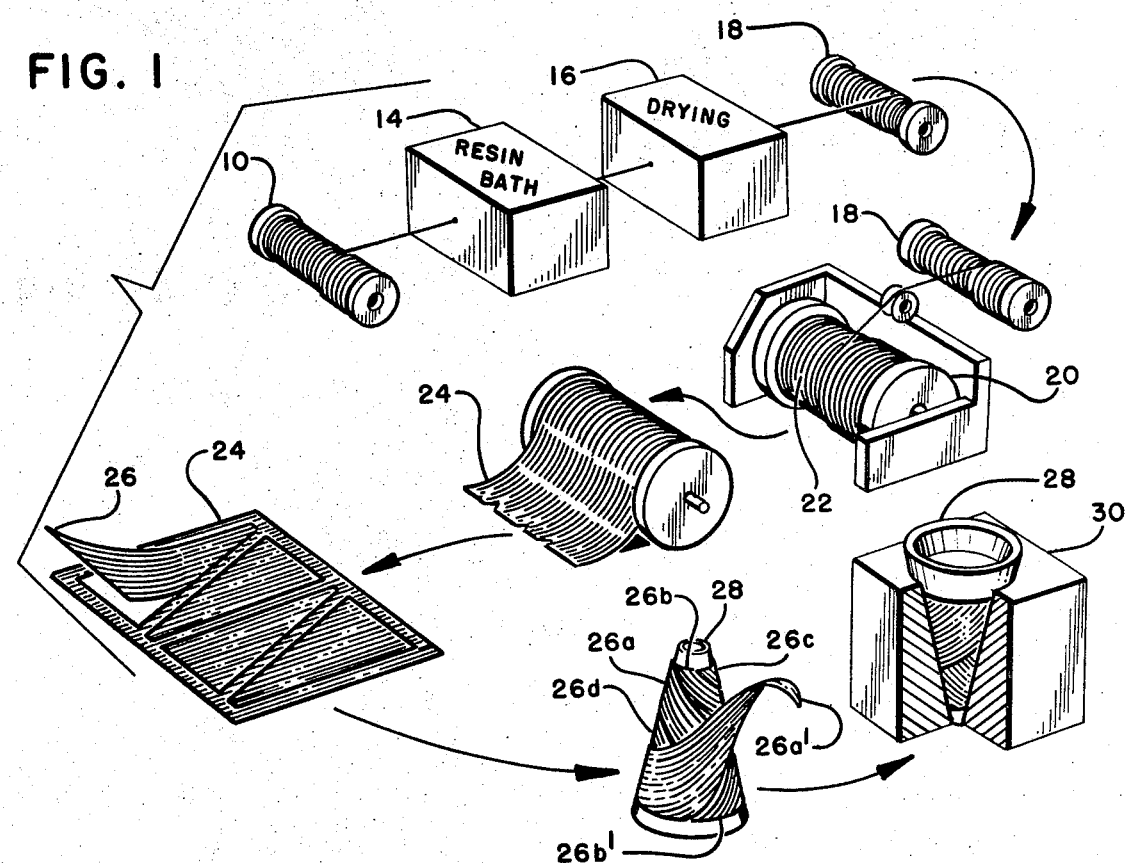
FIG. 1 illustrates in diagrammatic form the process of forming and the structure of this invention.

For best results, it has been found that the structures should generally be made with carbon or graphite yarns or fibers (sometimes also referred to as filaments) which have been preimpregnated with a suitable resin material. Preimpregnation may be accomplished, as shown in FIG. 1, by grouping without twisting a plurality of carbon yarns together into a roving 10, dipping or passing the roving through a resin dip tank or bath 14 containing an appropriate resin normally diluted with a volatile solvent to improve impregnation, drying the impregnated roving in a drying tower or the like 16 to remove solvents, and winding the impregnated roving on a suitable take-up spool 18. The prepared impregnated carbonized or graphitized yarn or roving may then be wound in a side by side manner on a relatively large diameter mandrel 20 on a suitable carrier film or layer 22 in a slightly spiral or helical arrangement of the yarn. When the carrier layer is covered or encased by the carbonized yarn or roving, the yarn and carrier can be cut or split along a longitudinal line following or parallel to the seam of layer 22 to form a mat 24 having a unidirectional carbonized yarn orientation. The yarn or fiber ends may be taped (such as prior to cutting mat) or otherwise held in position to prevent unraveling thereof during use of mat 24.

The mat 24 of unidirectional oriented carbonized yarn or fibers and carrier layer may be cut in suitably arranged sheets or gores 26 having fibers running parallel with a long dimension or side of sheet 26 as described below with respect to FIGS. 2a, 2b and 2c. The individual sheets 26 may be quadrangular with alternating obtuse and acute angles in a trapazodial or near trapazoidal shape with two sides or long dimensions substantially longer than the remaining sides. The individual fiber sheets 26 of unidirectional fibers and carrier layer may be fitted together in side by side manner and taped along the seams to form a complete, uniform thickness layer of the structure to be made or they may be individually positioned about a mandrel 28 to form the desired sheet layers. The sheets and their respective fibers are positioned on mandrel 28 with the fibers helically or spirally disposed thereabout. In general, four or more substantially similar or generally identical sheets shapes may be used to minimize yarn distortion and undesirably short yarn lengths and desired fiber orientation about the structure being formed. The respective sheets or complete layer are wrapped or positioned about mandrel 28 with the carrier layer side to the exterior. The entire layer may be taped into position and overwrapped with fiberglass or the like roving under tension to debulk the layer into its desired position. The fiberglass wrap may then be removed, the carrier layers peeled off and the carbon fiber layer suitably rolled or smoothed leaving a complete layer formed from sheets 26a, 26b, 26c and 26d. It should be further noted that the helix angle of any filament on a spiral wrapped cone varies in accordance with its axial station along the cone. Additional mats 24 may be cut into additional sheets or gores 26 having desired shape to prepare further layers of these sheets over the previous layers on mandrel 28, such as sheet 26a', until sufficient thickness or a desired thickness of the layers is achieved. Each of the layers is wrapped and debulked in the same manner and the carrier layer removed. Each of the layers is placed on the mandle 28 with the fiber direction at an angle or opposite angle with resect to the adjoining overlapping or underlying layer fibers. The desired oppositely spiraled fiber orientation of adjoining layers may be achieved by cutting gores 26 for each layer from mat 24 in opposite directions.

If it is desired, a first layer may be positioned on mandrel 28 with the fibers directed at angles of between about 15 to 75 degrees with respect to the longitudinal axis of the mandrel 28. The next layer may be positioned with the fibers at about 30 to 150 degree angles with respect to the first or adjoining layer fibers. A third layer may then be positioned over the first two layers with the fibers aligned with the longitudinal axes of mandrel 28 or at the same angle as the first layer or a different angle, as desired. Subsequent layers may then be placed on these layers with this or another fiber orientation sequence until the desired thickness of the part or structure is reached, possibly 50 or 60 layers or more.

If needed, the ends of the respective fiber sheet layers may be trimmed to a desired shape. The composite layers may be further debulked at this point by pressing the mandrel and wrapped layers in an appropriate punch and dye tooling. The debulked composite layers may then be cured under pressure from about 50 p.s.i. to 2000 pounds per square inch (p.s.i.) and temperatures from about 100 to 250° C., depending upon the preimpregnating resin used in resin bath 14. The cured structure may thereafter be positioned within an appropriate graphite punch and dye tooling 30 in an inert atmosphere and heated to carbonization or graphitization temperatures of from about 700 to 2500° C. while restrained in nominal size graphite matched tooling. Additional impregnations or reimpregnations with suitable low viscosity and high char forming resins and carbonization cycles may be used to regain any weight loss which may occur during the initial and subsequent carbonization cycles.

The initial carbon or graphite yarn or roving may typically be a fifteen end roving capable of producing a .015 inch thick unidirectional mat when wound with a 0.15 inch lead. Carrier layer 22 may be any appropriate film support having a high strength with small thickness, such as polyethyleneterephthalate.

Organic resin systems used for impregnating the carbon roving are polymers, preferably thermosetting polymers such that viscosity reduction does not occur during or prior to carbonization which may result in polymer flowing from the roving. Moreover, the thermosetting polymer utilized should undergo aromatization and cyclization during early stages of thermal breakodwn so as to provide a relatively high char yield. Phenolaldehyde, epoxylated novolacs, diphenyl oxides aldehyde cross-linked, furfuryl alcohol condensation products and resin-pitch combinations of these polymer systems have been found to be appropriate organic matrix systems, with or without appropriate organic or carbon fillers, such as graphite powders.

Figure 2B:
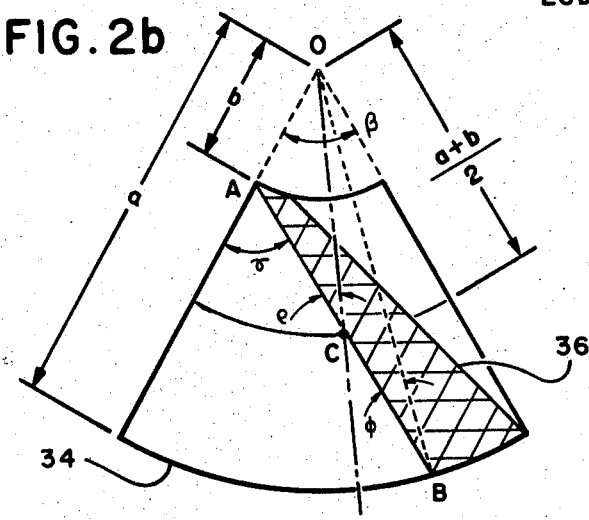
FIGS. 2a, 2b and 2c illustrate diagrammatically the formation and configuration of the fiber sheets used in constructing the structure of this invention for a truncated conoid structure.
Figure 2A:
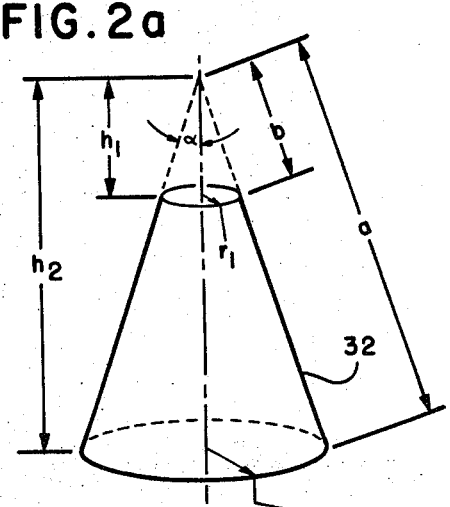
Figure 2C:
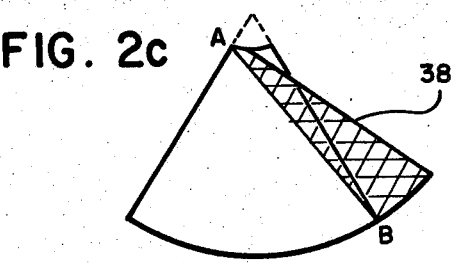

The fiber sheets or gores 26 may be formed for a truncated cone 32 having parameters shown in FIG. 2a using a layout 34 of the surface of the cone with a shaded gore 36 as shown in FIG. 2b using the following relationships and formulas:

$$x = \frac{\text{number of spaces of shift}}{\text{total number of spaces}} \quad (1)$$

$$\alpha = \tan^{-1}\frac{r_2 - r_2}{h_2 - h_1} \simeq \tan^{-1}\frac{r_2}{h_2} \simeq \tan^{-1}\frac{r_1}{h_1} \quad (2)$$

$$a = \sqrt{r_2^2 + h_2^2} \quad (3)$$

$$b = \sqrt{r_1^2 + h_1^2} \quad (4)$$

$$AB = \sqrt{a^2 + b^2 - 2ab\,\cos\left(\frac{2\pi x r_2}{a}\right)} \quad (5)$$

$$\beta = \frac{2\pi r_1}{b} \quad (6)$$

$$\gamma = \frac{x(2\pi r_2)}{a} + \phi \text{ where } 0 \leq \gamma \leq \frac{\pi}{2} \quad (7)$$

$$\rho = \sin^{-1}\left[\frac{2b\,\sin\,\gamma}{a+b}\right] \quad (8)$$

$$\phi = \sin^{-1}\left[\frac{b}{AB}\sin\left(\frac{2\pi r_2 x}{a}\right)\right] \quad (9)$$

The angles $\gamma$ (gamma), $\rho$ (rho), and $\phi$ (phi) are acute angles formed by the line AB with elements of the cone at their appropriate vertices (A, C, and B respectively). The fibers of the unidirectional fiber mat 24 are preferably positioned parallel with line AB of the gore. The variables of these formulas are these angles and $x$ which may be selected to achieve some desired structure strength characteristic. The approach used in selecting the angle of fiber spirals was to select a value for rho at approximately the midpoint of the cone length, which would represent a nominal area of the structure. In addition gamma should be determined because the fiber orientation on the small end of a conical structure is circumferential when gamma is $\pi/2$ which is undesirable from a delamination cause criteria.

For example, using a truncated cone having $r_1 = 3.5$ inches, $r_2 = 7.5$ inches and $h_2 - h_1 = 50$ inches with a desired $\rho$ of about 30°, $x$ will equal 1 (four spaces and four spaces of shift), $\gamma$ will equal about 49°, and $\phi$ will equal about 20°. The sheet or gore pattern for such an arrangement is shown by 38 in FIG. 2c. Carbonized truncated cones formed by the process of this invention using a sheet pattern 38 with up to forty layers of such sheets arranged as described above with four gores per layer produced devices exhibiting no delaminations or voids.

What is claimed is:

1. A carbon fiber conoid structure comprising a multiplicity of layers of carbon fibers, each of said layers including a plurality of similar elongated carbon fiber sheets laid along the long dimensions of said sheets in generally spiral fashion about said conoid structure, each sheet being quadrangular with two sides substantially longer than the other two sides and having unidirectional fibers laid side by side parallel to a long side of the sheet and with the fiber sheets of adjoining overlapping layers disposed in oppositely angled relationship with respect to each other.

2. The structure of claim 1 wherein each layer includes at least four of said sheets.

3. The structure of claim 1 wherein said structure is a frustum of a cone and said sheets are generally trapezoidal in shape with alternating obtuse and acute angles therebetween.

4. The structure of claim 1 including other layers of said unidirectional fiber sheets at still different angles with respect to said oppositely angled sheet layers.

5. The process of making a carbonized conoid structure comprising forming a mat of unidirectional carbon fibers, providing a plurality of quadrangular sheets from said mat having fibers laid side by side parallel to a long dimension of said sheets, wrapping said sheets about a mandrel in side by side and generally spiral manner to form a first layer thereabout, wrapping additional of said sheets about said mandrel in side by side and generally spiral manner to form a second layer overlapping said first layer at an angle generally oppositely disposed with respect to the sheets of said first layer, repeating said wrapping of sheets and additional sheets to build up a conoid structure of desired thickness, and thereafter carbonizing said layers to form a unitary structure.

6. The process of claim 5 including the additional step of impregnating said carbon fibers with a carbonizable resin prior to forming said mat.

7. The process of claim 5 wherein said carbonizing is at temperatures from about 700 to 2500° C. while restraining said layers with matched graphite tooling.

8. The process of claim 5 wherein said additional sheets are provided from an additionally formed mat of unidirectional carbon fibers.

9. The process of claim 5 including wrapping other sheets of unidirectional fibers at still different angles with respect to said sheets and additional sheets.

References Cited

UNITED STATES PATENTS

| | | | |
|---|---|---|---|
| 2,351,121 | 6/1944 | Hart | 156—190 X |
| 3,111,442 | 11/1963 | Voisin | 156—192 |
| 3,115,988 | 12/1963 | Warnken | 161—47 X |
| 3,367,812 | 2/1968 | Watts | 117—46 X |
| 3,420,721 | 1/1969 | Bayless et al. | 156—189 X |
| 3,551,268 | 12/1970 | Casadevall | 161—89 |
| 3,573,123 | 3/1971 | Siegel et al. | 156—190 X |
| 3,629,049 | 12/1971 | Olcott | 161—143 X |

WILLIAM A. POWELL, Primary Examiner

U.S. Cl. X.R.

156—174, 175, 189, 190; 161—58, 59, 143, 170